US011094254B2

United States Patent
Ueno

(10) Patent No.: US 11,094,254 B2
(45) Date of Patent: Aug. 17, 2021

(54) DISPLAY DEVICE AND METHOD FOR DRIVING SAME

(71) Applicant: SHARP KABUSHIKI KAISHA, Sakai (JP)

(72) Inventor: Tetsuya Ueno, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/982,450

(22) PCT Filed: Mar. 28, 2018

(86) PCT No.: PCT/JP2018/012755
§ 371 (c)(1),
(2) Date: Sep. 18, 2020

(87) PCT Pub. No.: WO2019/186764
PCT Pub. Date: Oct. 3, 2019

(65) Prior Publication Data
US 2021/0056901 A1 Feb. 25, 2021

(51) Int. Cl.
*G09G 3/3233* (2016.01)
*G09G 3/3266* (2016.01)
*G09G 3/3275* (2016.01)

(52) U.S. Cl.
CPC ......... *G09G 3/3233* (2013.01); *G09G 3/3266* (2013.01); *G09G 3/3275* (2013.01); *G09G 2310/0213* (2013.01); *G09G 2320/0233* (2013.01)

(58) Field of Classification Search
CPC .................................................. G09G 3/3233
USPC .......................................................... 345/76
See application file for complete search history.

(56) References Cited

U.S. PATENT DOCUMENTS

| | | | |
|---|---|---|---|
| 9,916,789 B2 * | 3/2018 | Shin .................... | G09G 3/3275 |
| 10,984,723 B1 * | 4/2021 | Zhou .................... | G09G 3/3258 |
| 2012/0001896 A1 | 1/2012 | Han et al. | |
| 2017/0263187 A1 * | 9/2017 | Zhu ....................... | G09G 3/3233 |
| 2017/0270853 A1 * | 9/2017 | Xiang .................. | G09G 3/3275 |

FOREIGN PATENT DOCUMENTS

JP   2011-164133 A   8/2011

* cited by examiner

*Primary Examiner* — Koosha Sharifi-Tafreshi
(74) *Attorney, Agent, or Firm* — ScienBiziP, P.C.

(57) ABSTRACT

The present invention discloses a current-driven display device employing an internal compensation scheme and capable of displaying a favorable image with no occurrence of a bright point not included in the original display content. A voltage Vg at a gate terminal of a drive transistor M1 is initialized in a pixel circuit 15 of an organic EL display device before a voltage of a data signal line Dj is written to a holding capacitor C1 via the drive transistor M1 in a diode-connected state. At this time, an initialization voltage Vini is supplied to the gate terminal via a first initialization transistor M4 and a threshold compensation transistor M3. In this manner, a path for initializing the gate terminal of the drive transistor M1 is formed by the first initialization transistor M4 and the threshold compensation transistor M3 connected in series to each other, thereby preventing a voltage reduction at the gate terminal due to leakage current in an off-state transistor.

10 Claims, 7 Drawing Sheets

DISPLAY DEVICE AND METHOD FOR DRIVING SAME

TECHNICAL FIELD

The present invention relates to a display device, and more particularly relates to a current-driven display device including a display element that is driven by a current, such as an organic electro luminescence (EL) display device, and to a method for driving the display device.

BACKGROUND ART

In recent years, an organic EL display device provided with a pixel circuit including an organic EL element (also referred to as organic light-emitting diode (OLED)) has been put into practical use. The pixel circuit of the organic EL display device includes, in addition to the organic EL element, a drive transistor, a write control transistor, a holding capacitor, and the like. A thin film transistor is used for the drive transistor and the write control transistor, the holding capacitor is connected to a gate terminal serving as a control terminal of the drive transistor, and a voltage (more specifically, a voltage indicating a gradation value of a pixel to be formed in the pixel circuit, and hereinafter referred to as "data voltage") corresponding to a video signal representing an image to be displayed is supplied to the holding capacitor from the drive circuit via a data signal line. The organic EL element is a self-emitting display element that emits light with a luminance corresponding to a current flowing therethrough. The drive transistor is provided in series with the organic EL element and controls the current flowing through the organic EL element in accordance with the voltage held by the holding capacitor.

Variations or shifts occur in the characteristics of the organic EL element and the drive transistor. Thus, for performing a high-quality display in the organic EL display device, it is necessary to compensate for variations and shifts in the characteristics of these elements. As for the organic EL display device, a method of compensating the characteristics of the element inside the pixel circuit and a method of compensating the characteristics outside the pixel circuit are known. As a pixel circuit corresponding to the former method, there is known a pixel circuit configured to initialize a voltage at a gate terminal of a drive transistor, that is, a voltage held in a holding capacitor, and then charge the holding capacitor with a data voltage via the drive transistor in a diode-connected state. In such a pixel circuit, variations and shifts in the threshold voltage in the drive transistor are compensated (hereinafter, the compensation for the variations and shifts of the threshold voltage will be referred to as "threshold compensation").

A matter related to an organic EL display device of a scheme (hereinafter referred to as "internal compensation scheme") for performing threshold compensation in a pixel circuit as mentioned above is described in, for example, Patent Document 1. In other words, Patent Document 1 discloses several pixel circuits configured to initialize a voltage at a gate terminal of a drive transistor, that is, a voltage held in a holding capacitor, to a predetermined level, and then charge the holding capacitor with a data voltage via the drive transistor in a diode-connected state. In these pixel circuits, the voltage at the gate terminal to which the holding capacitor is connected is initialized by an initialization power supply VINT via a path including a plurality of transistors (e.g., see FIGS. 4, 8A, and 10).

PRIOR ART DOCUMENT

Patent Documents

Patent Document 1: US 2012/0001896 A1
Patent Document 2: JP 2011-164133 A

SUMMARY OF THE INVENTION

Problems to be Solved by the Invention

In the organic EL display device of the internal compensation scheme, when the pixel circuit is configured to initialize the voltage at the gate terminal of the drive transistor (corresponding to the hold voltage of the holding capacitor) and then write a data voltage to the holding capacitor via the drive transistor in the diode-connected state as described above, a bright point (hereinafter referred to as "defective bright point") not included in the original display content may occur in a display image.

Therefore, it is desired to display a favorable image in which no defective bright point occurs in a current-driven display device such as an organic EL display device of an internal compensation scheme.

Several embodiments of the present invention provide a display device having a plurality of data signal lines, a plurality of scanning signal lines intersecting with the plurality of data signal lines, a plurality of light emission control lines corresponding respectively to the plurality of scanning signal lines, and a plurality of pixel circuits arranged in a matrix along the plurality of data signal lines and the plurality of scanning signal lines. The display device includes:

first and second power lines;
an initialization voltage supply line;
a data signal line drive circuit configured to drive the plurality of data signal lines;
a scanning signal line drive circuit configured to selectively drive the plurality of scanning signal lines; and
a light emission control circuit configured to drive the plurality of light emission control lines,
wherein
each of the pixel circuits includes
a display element that is driven by a current,
a holding capacitor configured to hold a voltage for controlling a drive current of the display element,
a drive transistor configured to control the drive current of the display element in accordance with a voltage held by the holding capacitor,
a write control switching element,
a threshold compensation switching element,
first and second light emission control switching elements, and
first and second initialization switching elements,
the drive transistor has a first conduction terminal connected to any one of the plurality of data signal lines via the write control switching element as well as connected to the first power line via the first light emission control switching element,
the drive transistor has a second conduction terminal connected to a first terminal of the display element via the second light emission control switching element and connected to the initialization voltage supply line via the first initialization switching element, the drive transistor has a control terminal connected to the first power line via the holding capacitor as well as connected to the second conduction terminal via the threshold compensation switching element, the display element has the first terminal connected to the initialization voltage supply line via the second initialization switching element, and a second terminal connected to the second power line, and at a time of initializing a hold voltage of the holding capacitor, the threshold compensation switching element and the first initialization switching element are controlled to be in an on-state.

Several other embodiments of the present invention provide a method for driving a display device that has a plurality of data signal lines, a plurality of scanning signal lines intersecting with the plurality of data signal lines, a plurality of light emission control lines corresponding respectively to the plurality of scanning signal lines, first and second power lines, an initialization voltage supply line, and a plurality of pixel circuits arranged in a matrix along the plurality of data signal lines and the plurality of scanning signal lines. The method includes an initialization step of initializing each of the pixel circuits, wherein each of the pixel circuits includes a display element that is driven by a current, a holding capacitor configured to hold a voltage for controlling a drive current of the display element, a drive transistor configured to control the drive current of the display element in accordance with a voltage held by the holding capacitor, a write control switching element, a threshold compensation switching element, first and second light emission control switching elements, and first and second initialization switching elements, the drive transistor has a first conduction terminal connected to any one of the plurality of data signal lines via the write control switching element as well as connected to the first power line via the first light emission control switching element, the drive transistor has a second conduction terminal connected to a first terminal of the display element via the second light emission control switching element as well as connected to the initialization voltage supply line via the first initialization switching element, the drive transistor has a control terminal connected to the first power line via the holding capacitor as well as connected to the second conduction terminal via the threshold compensation switching element, the display element has the first terminal connected to the initialization voltage supply line via the second initialization switching element, and a second terminal connected to the second power line, and in the initialization step, at a time of initializing a hold voltage of the holding capacitor, the threshold compensation switching element and the first initialization switching element are controlled to be in an on-state.

Effects of the Invention

In the above-described some embodiments of the present invention, the pixel circuit is configured such that the voltage of the data signal line is supplied to the holding capacitor as a data voltage via the drive transistor in the diode-connected state brought about by the threshold compensation switching element, and the hold voltage of the holding capacitor is initialized before such writing of the data voltage. Further, in this pixel circuit, the control terminal of the drive transistor is connected to the first power line via the holding capacitor and also connected to the second conduction terminal of the drive transistor via the threshold compensation switching element, and the second conduction terminal is connected to the initialization voltage supply line via the first initialization switching element. In such a connection configuration, at the time of initializing the hold voltage of the holding capacitor, the threshold compensation switching element and the first initialization switching element are controlled to be in the on-state. Therefore, in the period for the initialization, the voltage of the initialization voltage supply line, that is, the initialization voltage, is supplied to the holding capacitor via the first initialization switching element and the threshold compensation switching element. In this way, a path for initializing the hold voltage of the holding capacitor, that is, the voltage at the control terminal of the drive transistor, is formed by the first initialization switching element and the threshold compensation switching element connected in series with each other. In this respect, the pixel circuit in the above-described some embodiments is different from the conventional pixel circuit in which only one initialization transistor is included in the path for the initialization. It is thus possible to prevent the voltage reduction of the control terminal of the drive transistor due to leakage current of an off-state transistor in an emission period, without increasing the size of the initialization transistor as compared to the conventional case. Therefore, according to the above-described some embodiments of the present invention, it is possible to achieve a pixel circuit having a function of threshold compensation and not generating a defective bright point (a bright point not included in the display content) due to the leakage current, without increasing the area of the pixel circuit.

MODES FOR CARRYING OUT THE INVENTION

Each embodiment will be described below with reference to the accompanying drawings. In each transistor described below, a gate terminal corresponds to a control terminal, one of a drain terminal and a source terminal corresponds to a first conduction terminal, and the other corresponds to a second conduction terminal. All of the transistors in each embodiment are of P-channel type, but the present invention is not limited thereto. The transistor in each embodiment is, for example, a thin film transistor, but the present invention is not limited thereto. Further, "connection" in the present specification means "electrical connection" unless otherwise specified, and includes not only the case of meaning direct connection but also the case of meaning indirect connection via another element in the scope not deviating from the gist of the present invention.

1. First Embodiment

<1.1 Overall Configuration>

Figure 1:
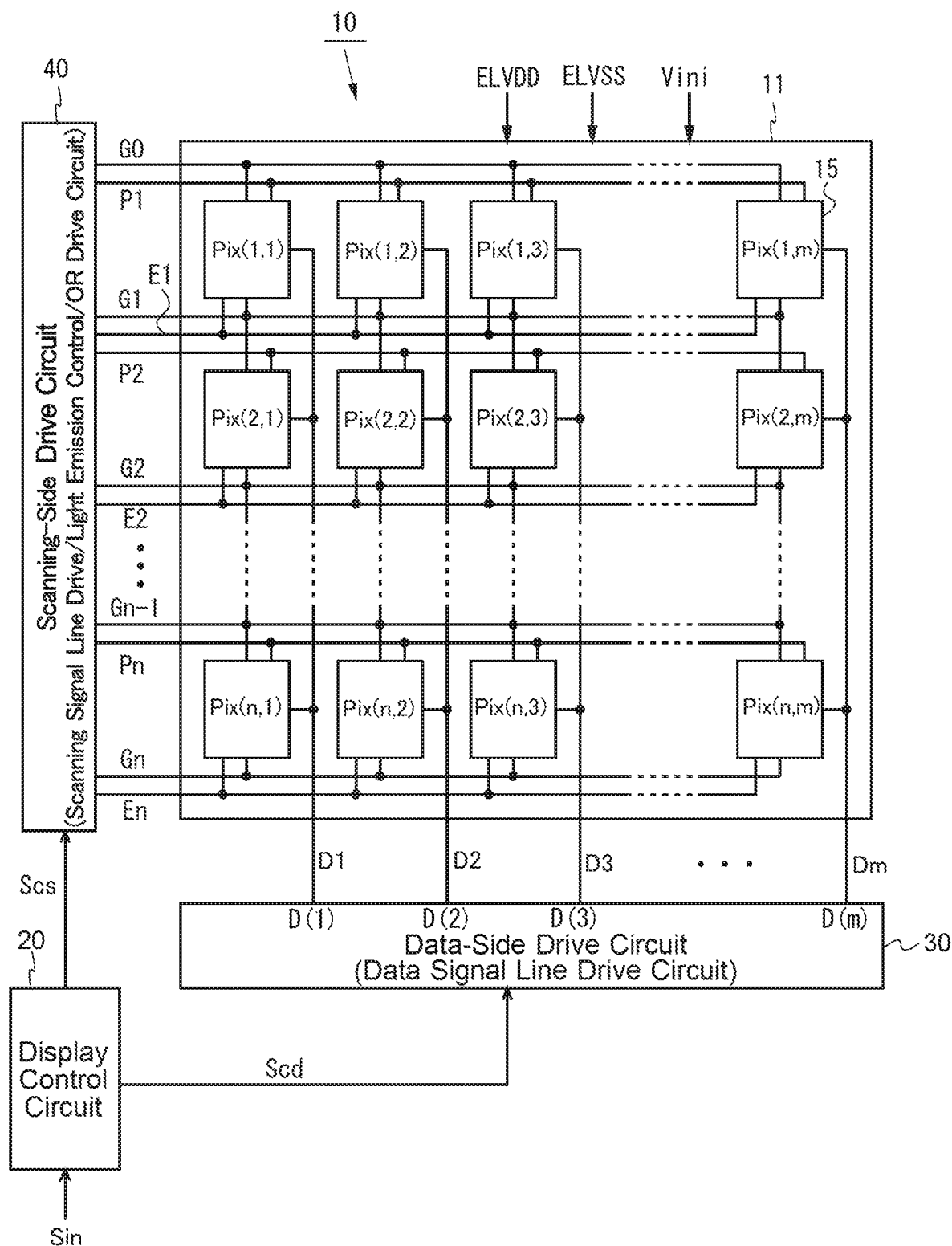
FIG. 1 is a block diagram illustrating an overall configuration of a display device according to a first embodiment.

FIG. 1 is a block diagram illustrating an overall configuration of an organic EL display device 10 according to a first embodiment. The display device 10 is an organic EL display device that performs internal compensation. That is, in the display device 10, when pixel data is written to each pixel circuit, a holding capacitor is charged with a voltage of a data signal (data voltage) via a drive transistor in a diode-connected state in the pixel circuit, thereby compensating for variations and shifts in the threshold voltage of the drive transistor (details will be described later).

As illustrated in FIG. 1, the display device 10 includes a display unit 11, a display control circuit 20, a data-side drive circuit 30, and a scanning-side drive circuit 40. The data-side drive circuit functions as a data signal line drive circuit (also referred to as "data driver"). The scanning-side drive circuit 40 functions as a scanning signal line drive circuit (also referred to as "gate driver"), a light emission control circuit (also referred to as "emission driver"), and an OR drive circuit. In the configuration illustrated in FIG. 1, these three drive circuits are achieved as one scanning-side drive circuit 40, but the three drive circuits in the scanning-side drive circuit 40 may be separated as appropriate, or the three drive circuits may be separated into two scanning-side drive circuits and disposed on one side and the other side of the display unit 11. The scanning-side drive circuit may be formed integrally with the display unit 11. These points also apply to other embodiments and modifications described later.

In the display unit 11, m (m is an integer equal to or greater than 2) data signal lines D1 to Dm and n+1 (n is an integer equal to or greater than 2) scanning signal lines G0 to Gn intersecting with the data signal lines D1 to Dm are arranged, n light emission control lines (also referred to as "emission lines") E1 to En are arranged along the n scanning signal lines G1 to Gn, respectively, and n OR signal lines P1 to Pn are arranged along the n scanning signal lines G1 to Gn, respectively (details of the OR signal lines will be described later). As illustrated in FIG. 1, the display unit 11 is provided with m×n pixel circuits 15, the m×n pixel circuits 15 are arranged in a matrix along the m data signal lines D1 to Dm and the n scanning signal lines G1 to Gn, and each pixel circuit 15 corresponds to any one of the m data signal lines D1 to Dm and any one of the n scanning signal lines G1 to Gn (hereinafter, in a case where the pixel circuits 15 are distinguishing from each other, the pixel circuit corresponding to the ith scanning signal line Gi and the jth data signal line Dj is also referred to as "pixel circuit on the ith row and the jth column" and denoted by symbol "Pix(i, j)"). The n light emission control lines E1 to En correspond to the n scanning signal lines G1 to Gn, respectively, and the n OR signal lines P1 to Pn also correspond to the n scanning signal lines G1 to Gn, respectively. Therefore, each pixel circuit 15 corresponds to any one of the n light emission control lines E1 to En and any one of the n OR signal lines P1 to Pn.

A power line (not illustrated) common to each pixel circuit 15 is disposed on the display unit 11. That is, there are provided a power line configured to supply a high-level power supply voltage ELVDD for driving the organic EL element to be described later (hereinafter, the line will be referred to as "high-level power line" and denoted by the same symbol "ELVDD" as the high-level power supply voltage) and a power line configured to supply a low-level power supply voltage ELVSS for driving the organic EL element (hereinafter, the line will be referred to as "low-level power line" and denoted by the same symbol "ELVSS" as the low-level power supply voltage). Further, an initialization voltage supply line (not illustrated) for supplying an initialization voltage Vini to be used in a reset operation for initialization (details will be described later) of each pixel circuit 15 (the line being denoted by the symbol "Vini" as the initialization voltage) is also disposed in the display unit 11. The high-level power supply voltage ELVDD, the low-level power supply voltage ELVSS, and the initialization voltage Vini are supplied from a power supply circuit (not illustrated).

The display control circuit 20 receives an input signal Sin including image information representing an image to be displayed and timing control information for image display from the outside of the display device 10, generates a data-side control signal Scd and a scanning-side control signal Scs based on the input signal Sin, and outputs the data-side control signal Scd and the scanning-side control signal Scs to a data-side drive circuit (data signal line drive circuit) 30 and a scanning-side drive circuit (scanning signal line drive/light emission control/OR drive circuit) 40, respectively.

The data-side drive circuit 30 drives the data signal lines D1 to Dm based on the data-side control signal Scd from the display control circuit 20. That is, based on the data-side control signal Scd, the data-side drive circuit 30 outputs the m data signals D(1) to D(m) representing an image to be displayed in parallel and applies the data signals to the data signal lines D1 to Dm, respectively.

The scanning-side drive circuit 40 functions as a scanning signal line drive circuit for driving the scanning signal lines G0 to Gn, a light emission control circuit for driving the light emission control lines E1 to En, and an OR drive circuit for driving the OR signal lines P1 to Pn based on the scanning-side control signal Scs from the display control circuit 20. More specifically, as the scanning signal line drive circuit, based on the scanning-side control signal Scs, the scanning-side drive circuit 40 sequentially selects the scanning signal lines G0 to Gm in each frame period, applies an active signal (low-level voltage) to the selected scanning signal line Gk, and applies an inactive signal (high-level voltage) to the non-selected scanning signal lines. Thus, m pixel circuits Pix(k,1) to Pix(k,m) corresponding to the selected scanning signal line Gk (1≤k≤n) are selected collectively. As a result, the voltages (hereinafter, these voltages may be referred to simply as "data voltage" without distinction) of the m data signals D(1) to D(m) applied from the data-side drive circuit 30 to the data signal lines D1 to Dm during a selection period for the scanning signal line Gk (hereinafter referred to as "kth scanning selected period") are written as pixel data to the pixel circuits Pix(k,1) to Pix(k,m), respectively.

Further, as the light emission control circuit, based on the scanning-side control signal Scs, the scanning-side drive circuit 40 applies a light emission control signal (high-level voltage) indicating non-emission to an ith light emission control line Ei in an (i−1)th horizontal period and an ith horizontal period and applies a light emission control signal (low-level voltage) indicating light emission in the other periods. While the voltage of the light emission control line Ei is at a low level, the organic EL elements in the pixel circuits (hereinafter also referred to as "pixel circuit on the ith row") Pix (i, 1) to Pix(i,m) corresponding to the ith scanning signal line Gi emit light with a luminance corresponding to the data voltages written respectively in the pixel circuits Pix(i,1) to Pix(i,m) on the ith row.

As the OR drive circuit, based on the scanning-side control signal Scs, the scanning-side drive circuit 40 applies, to an ith OR signal line Pi, a signal (hereinafter also referred to as "ith OR signal P(i)") of logical sum of a scanning signal on the ith scanning signal line Gi (also referred to as "ith scanning signal G(i)") and a scanning signal on a scanning signal line Gi−1 immediately before the scanning signal line Gi (referred to as "(i−1)th scanning signal G(i−1)"). In the present embodiment, since the scanning signal is a negative logic signal, the ith OR signal P(i) is at a low level when either the (i−1)th scanning signal G(i−1) or the ith scanning signal G(i) is at a low level. In the following description, the ith OR signal line may be denoted by "Gi−1 U Gi" instead of "Pi."

<1.2 Configuration and Operation of Pixel Circuit in Conventional Example>

Hereinafter, prior to the description of the configuration and operation of the pixel circuit 15 in the present embodiment, the configuration and operation of a pixel circuit 15a in a conventional organic EL display device (hereinafter referred to as "conventional example") as a pixel circuit for comparison with the pixel circuit 15 will be described with reference to FIGS. 2 and 3. In the conventional example, unlike the configuration illustrated in FIG. 1, the display unit 11 does not include the OR signal lines P1 to Pn, and the scanning-side drive circuit does not have the function of the OR drive circuit. The other parts in the overall configuration of the conventional example are the same as those in the configuration illustrated in FIG. 1.

Figure 2:
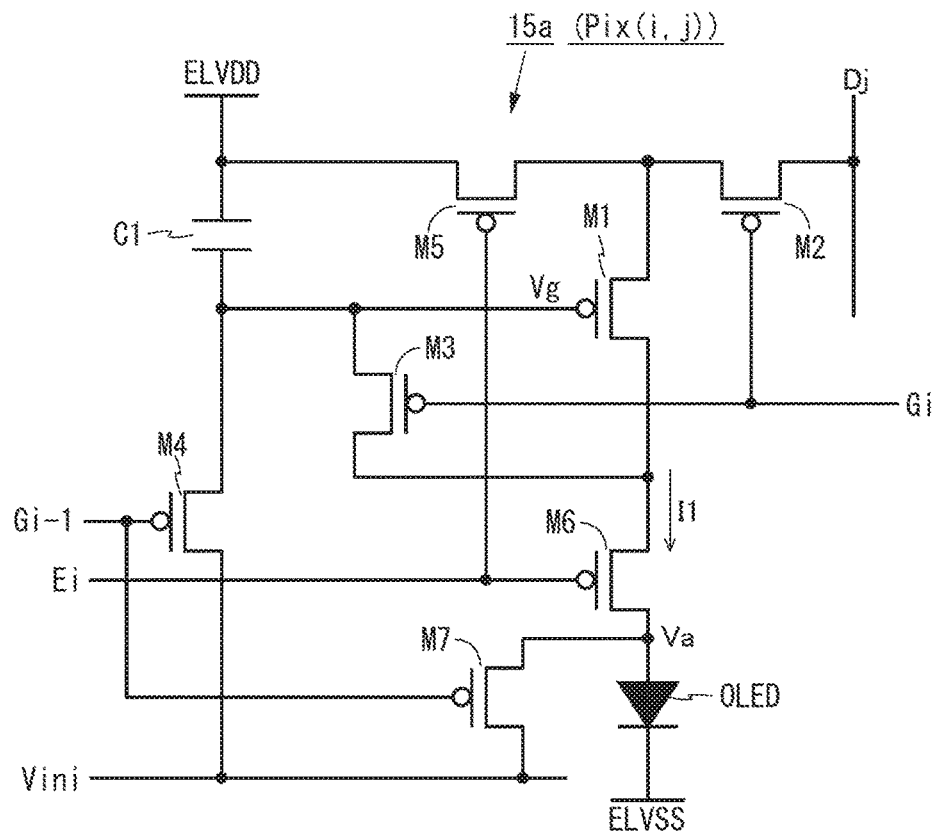
FIG. 2 is a circuit diagram illustrating a configuration of a pixel circuit in a conventional display device.

FIG. 2 is a circuit diagram illustrating the configuration of the pixel circuit 15a in the above conventional example, and more specifically, a circuit diagram illustrating the configuration of the pixel circuit 15a corresponding to the ith scanning signal line Gi and the jth data signal line Dj, that is, the pixel circuit Pix(i,j) on the ith row and jth column (1≤i≤n and 1≤j≤m). As illustrated in FIG. 2, the pixel circuit 15a includes an organic EL element OLED as a display element, a drive transistor M1, a write control transistor M2, a threshold compensation transistor M3, a first initialization transistor M4, a first light emission control transistor M5, a second light emission control transistor M6, a second initialization transistor M7, and a holding capacitor C1. In the pixel circuit 15a, transistors M2 to M7 other than the drive transistor M1 function as switching elements.

To the pixel circuit 15a, there are connected a scanning signal line (hereinafter also referred to as "corresponding scanning signal line" in the description focusing on the pixel circuit) Gi corresponding to the pixel circuit 15a, a scanning signal line (a scanning signal line immediately before in the scanning order of the scanning signal lines G1 to Gn, hereinafter also referred to as "preceding scanning signal line" in the description focusing on the pixel circuit) Gi−1 immediately before the corresponding scanning signal line Gi, a light emission control line (hereinafter also referred to as "corresponding light emission control line" in the description focusing on the pixel circuit) Ei corresponding to the pixel circuit 15a, a data signal line (hereinafter also referred to as "corresponding data signal line" in the description focusing on the pixel circuit) Dj corresponding to the pixel circuit 15a, an initialization voltage supply line Vini, a high-level power line ELVDD, and a low-level power line ELVSS.

As illustrated in FIG. 2, in the pixel circuit 15a, the source terminal as the first conduction terminal of the drive transistor M1 is connected to the corresponding data signal line Dj via the write control transistor M2 and is connected to the high-level power line ELVDD via the first light emission control transistor M5. The drain terminal as the second conduction terminal of the drive transistor M1 is connected to an anode electrode of the organic EL element OLED via the second light emission control transistor M6. The gate terminal of the drive transistor M1 is connected to the high-level power line ELVDD via the holding capacitor C1, is connected to the drain terminal of the drive transistor M1 via the threshold compensation transistor M3, and is connected to the initialization voltage supply line Vini via the first initialization transistor M4. The anode electrode of the organic EL element OLED is connected to the initialization voltage supply line Vini via a second initialization transistor M7, and a cathode electrode of the organic EL element OLED is connected to the low-level power line ELVSS. The gate terminals of the write control transistor M2 and the threshold compensation transistor M3 are connected to the corresponding scanning signal line Gi, the gate terminals of the first and second light emission control transistors M5, M6 are connected to the corresponding light emission control line Ei, and the gate terminals of the first and second initialization transistors M4, M7 are connected to the preceding scanning signal line Gi−1.

The drive transistor M1 operates in a saturation region, and a drive current I1 flowing through the organic EL element OLED in the emission period is given by Equation (1) below: A gain β, of the drive transistor M1 included in Equation (1) is given by Equation (2) below.

$$I1 = (\beta/2)(|Vgs| - |Vth|)^2 \quad (1)$$
$$= (\beta/2)(|Vg - ELVDD| - |Vth|)^2$$
$$B = \mu \times (w/L) \times Cox \quad (2)$$

In Equations (1) and (2) above, Vth, μ, W, L, and Cox represent the threshold voltage, mobility, gate width, gate length, and gate insulating film capacitance per unit area of the drive transistor M1, respectively.

Figure 3:
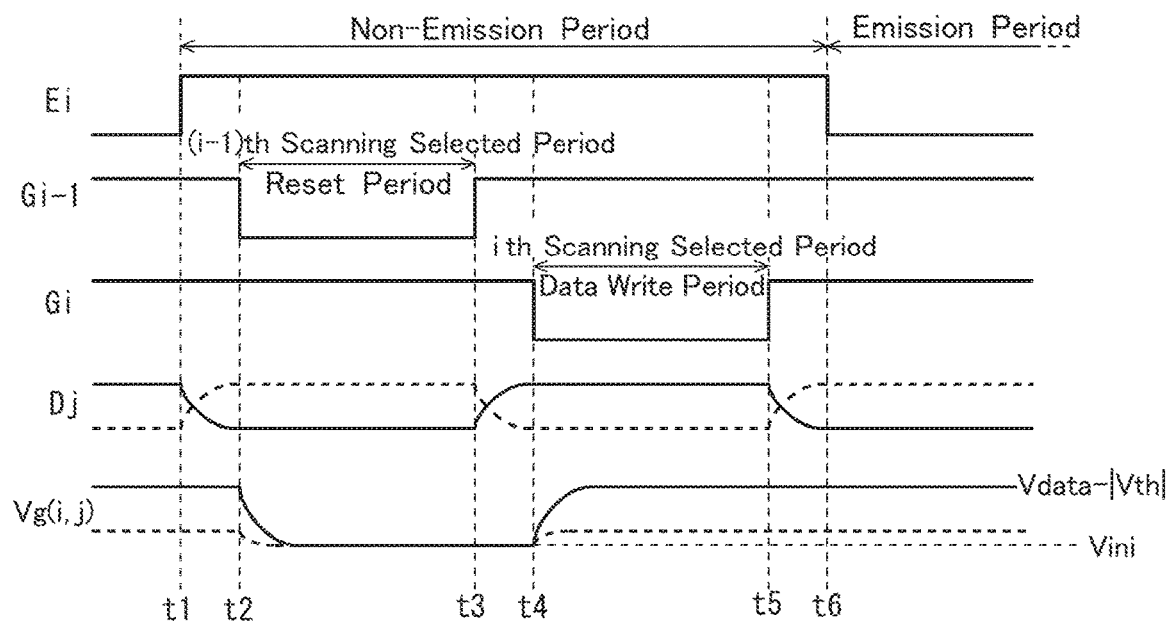
FIG. 3 is a signal waveform diagram for describing the driving of the conventional display device.

FIG. 3 is a signal waveform diagram for describing the driving of the display device according to the above conventional example and illustrates changes in the voltage of each signal line (corresponding light emission control line Ei, preceding scanning signal line Gi−1, corresponding scanning signal line Gi, and corresponding data signal line Dj) and the voltage (hereinafter referred to as "gate voltage")

Vg of the gate terminal of the drive transistor M1 during the reset operation, the data write operation, and the lighting operation of the pixel circuit 15a illustrated in FIG. 2, that is, the pixel circuit Pix(i,j) on the ith row and the jth column. In FIG. 3, a period from time t1 to time t6 is a non-emission period for the pixel circuits Pix(i,1) to Pix(i,m) on the ith row. A period from time t2 to t4 is the (i−1)th horizontal period, and a period from time t2 to t3 is a selection period for the (i−1)th scanning signal line (preceding scanning signal line) Gi−1 (hereinafter referred to as "(i−1)th scanning selected period"). The (i−1)th scanning selected period corresponds to a reset period for the pixel circuits Pix(i,1) to Pix(i,m) on the ith row, A period from time t4 to time t6 is the ith horizontal period, and a period from time t4 to time t5 is a selection period for the ith scanning signal line (corresponding scanning signal line) Gi (hereinafter referred to as "ith scanning selected period"). The ith scanning selected period corresponds to a data write period for the pixel circuits Pix(i,1) to Pix(i,m) on the ith row.

In the pixel circuit Pix(i,j) on the ith row and the jth column, when the voltage of the light emission control line Ei changes from the low level to the high level at time t1 as illustrated in FIG. 3, the first and second light emission control transistors M5, M6 change from the on-state to the off-state, and the organic EL element OLED comes into a non-emission state. During the period from time t1 to the start time t2 of the (i−1)th scanning selected period, the data-side drive circuit 30 starts to apply a data signal D(j) as the data voltage of the pixel in the (i−1)th row and jth column to the data signal line Dj, but in the pixel circuit Pix(i,j), the write control transistor M2 connected to the data signal line Dj is in the off-state.

At time t2, the voltage of the preceding scanning signal line Gi−1 changes from the high level to the low level, so that the preceding scanning signal line Gi−1 comes into a selected state. Therefore, the first and second initialization transistors M4, M7 change to the on-state. Thereby, the voltage at the gate terminal of the drive transistor M1, that is, the gate voltage Vg is initialized to be the initialization voltage Vini. The initialization voltage Vini is such a voltage that the drive transistor M1 can be maintained in the on-state at the time of writing the data voltage to the pixel circuit Pix(i,j). More specifically, the initialization voltage Vini satisfies Equation (3) below.

$$|Vini - Vdata| > |Vth| \quad (3)$$

Here, Vdata is a data voltage (a voltage of the corresponding data signal line Dj), and Vth is a threshold voltage of the drive transistor M1. Further, since the drive transistor M1 in the present embodiment is of the P-channel type, Vini <Vdata . . . (4)

By the initialization of the gate voltage Vg with the initialization voltage Vini as thus described, it is possible to reliably write the data voltage to the pixel circuit Pix(i,j). Note that the initialization of the gate voltage Vg is also the initialization of the hold voltage of the holding capacitor C1. At time t2, the voltage of the preceding scanning signal line Gi−1 changes from the high level to the low level, so that the second initialization transistor M7 also changes to the on-state. As a result, the accumulated charge in the parasitic capacitance of the organic EL element OLED is released, and a voltage (hereinafter referred to as "anode voltage") Va of the anode electrode of the organic EL element is initialized.

The period from time t2 to time t3 is a reset period in the pixel circuits Pix(i,1) to Pix(i,m) on the ith row, and in the pixel circuit Pix(i,j), the gate voltage Vg and the anode voltage Va are initialized by the first and second initialization transistors M4, M7 being on the on-state as described above in the reset period. FIG. 3 illustrates a change in the gate voltage Vg(i,j) of the pixel circuit Pix(i,j) at this time. Note that symbol "Vg(i, j)" is used in a case where the gate voltage Vg in the pixel circuit Pix(i,j) is distinguished from the gate voltage Vg in another pixel circuit (the same shall apply hereinafter).

At time t3, the voltage of the preceding scanning signal line Gi−1 changes to the high level, so that the preceding scanning signal line Gi−1 comes into an unselected state. Hence the first and second initialization transistors M4, M7 changes to the off-state. During the period from time t3 to the start time t4 of the ith scanning selected period, the data-side drive circuit 30 starts to apply the data signal D(j) as the data voltage of the pixel on the ith row and jth column to the data signal line Dj and continues to apply the data signal D(j) at least until the end time t5 of the ith scanning selected period.

At time t4, the voltage of the corresponding scanning signal line Gi changes from the high level to the low level, so that the corresponding scanning signal line Gi comes into the selected state. Hence the write control transistor M2 changes to the on-state. Since the threshold compensation transistor M3 also changes to the on-state, the drive transistor M1 comes into a state where the gate terminal and drain terminal thereof are connected, that is, in a diode-connected state. Thereby, the voltage of the corresponding data signal line Dj, that is, the voltage of the data signal D(j), is supplied as the data voltage Vdata to the holding capacitor C1 via the drive transistor M1 in the diode-connected state. As a result, as illustrated in FIG. 3, the gate voltage Vg(i,j) changes toward a value given by Equation (5) below.

$$Vg(i,j) = Vdata - |Vth| \quad (5)$$

The period from time t4 to time t5 is a data write period in the ith pixel circuits Pix(i,1) to Pix(i,m), and in the pixel circuit Pix(i,j), the data voltage subjected to the threshold compensation as described above is written to the holding capacitor C1 in the data write period, and the gate voltage Vg(i,j) becomes the value given by Equation (5) above.

Thereafter, at time t6, the voltage of the light emission control line Ei changes to the low level. Accordingly, the first and second light emission control transistors M5, M6 change to the on-state. Therefore, after time t6, a current I1 flows from the high-level power line ELVDD to the low-level power line ELVSS via the first light emission control transistor M5, the drive transistor M1, the second light emission control transistor M6, and the organic EL element OLED. The current I1 is given by Equation (1) above. Considering that the drive transistor M1 is of the P-channel type and ELVDD>Vg, the current I1 is given by Equations (1) and (5) above, as follows:

$$I1 = (\beta/2)(ELVDD - Vg - |Vth|)^2 \quad (6)$$
$$= (\beta/2)(ELVDD - Vdata)^2$$

As described above, after time t6, the organic EL element OLED emits light with a luminance corresponding to the data voltage Vdata, which is the voltage of the corresponding data signal line Dj in the ith scanning selected—period, regardless of the threshold voltage Vth of the drive transistor M1.

<1.3 Problems in the Prior Art>

As described above, in the display device of the conventional example, that is, the display device using the pixel circuit configured to initialize the gate voltage of the drive transistor and then write the data voltage to the holding capacitor via the drive transistor in the diode-connected state, there is a problem that a defective bright point occurs in the display image. The inventor of the present invention has studied the operation of the pixel circuit 15a in the conventional example in order to clarify the cause of the occurrence of the defective bright point as described above. The results of the studies will be described below.

As described above, in the pixel circuit 15a (Pix(i,j)) in the conventional example, the voltage of the corresponding data signal line Dj is supplied as the data voltage Vdata to the holding capacitor C1 via the drive transistor M1 in the diode-connected state, thereby compensating for variations and shifts in the threshold voltage Vth of the drive transistor M1. In the pixel circuit of such an internal compensation scheme, the initialization of the gate voltage Vg of the drive transistor M1, that is, the initialization of the hold voltage of the holding capacitor C1, is required before the data write operation. Therefore, in the above conventional example, as illustrated in FIG. 2, the gate terminal of the drive transistor M1 is connected to the initialization voltage supply line Vini via the first initialization transistor M4.

In a case where black display is performed in the pixel circuit 15a in the conventional example as thus described, a high voltage close to the high-level power supply voltage ELVDD is supplied to the gate terminal thereof as the data voltage Vdata via the drive transistor M1 in the diode-connected state in the data write period, and the gate voltage Vg is maintained at the high voltage by the holding capacitor C1 in the emission period. Therefore, a relatively high voltage (e.g., about 8 V) is continuously applied between the source and drain of the first initialization transistor M4 in the off-state in the emission period. As a result, leakage current may occur in the first initialization transistor M4, and the gate voltage Vg may be reduced. In this case, an amount of current not corresponding to the value of the written data voltage flows through the drive transistor M1 and the organic EL element OLED, and a bright point not included in the original display content (defective bright point) occurs. In particular, when the off-resistance of the first initialization transistor M4 becomes small or the threshold voltage (absolute value) of the drive transistor M1 becomes small due to manufacturing variations, defective bright points are likely to occur.

In order to prevent the occurrence of the defective bright point as thus described, a transistor having a multi-gate structure, a transistor having a large channel length, or two transistors connected in series with each other may be used as the first initialization transistor M4. However, when such a transistor is used, the size of the first initialization transistor M4 increases, making it difficult to achieve a compact pixel circuit.

<1.4 Configuration and Operation of Pixel Circuit in Present Embodiment>

Figure 4:
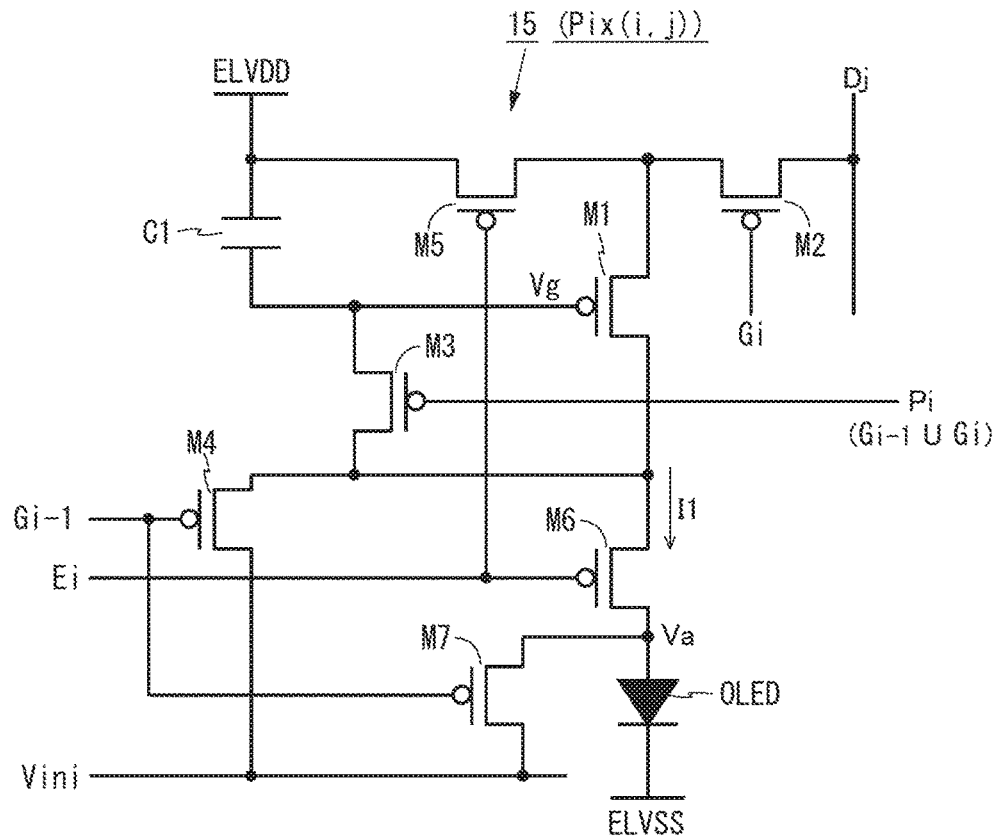
FIG. 4 is a circuit diagram illustrating a configuration of a pixel circuit in the first embodiment.
Figure 5:
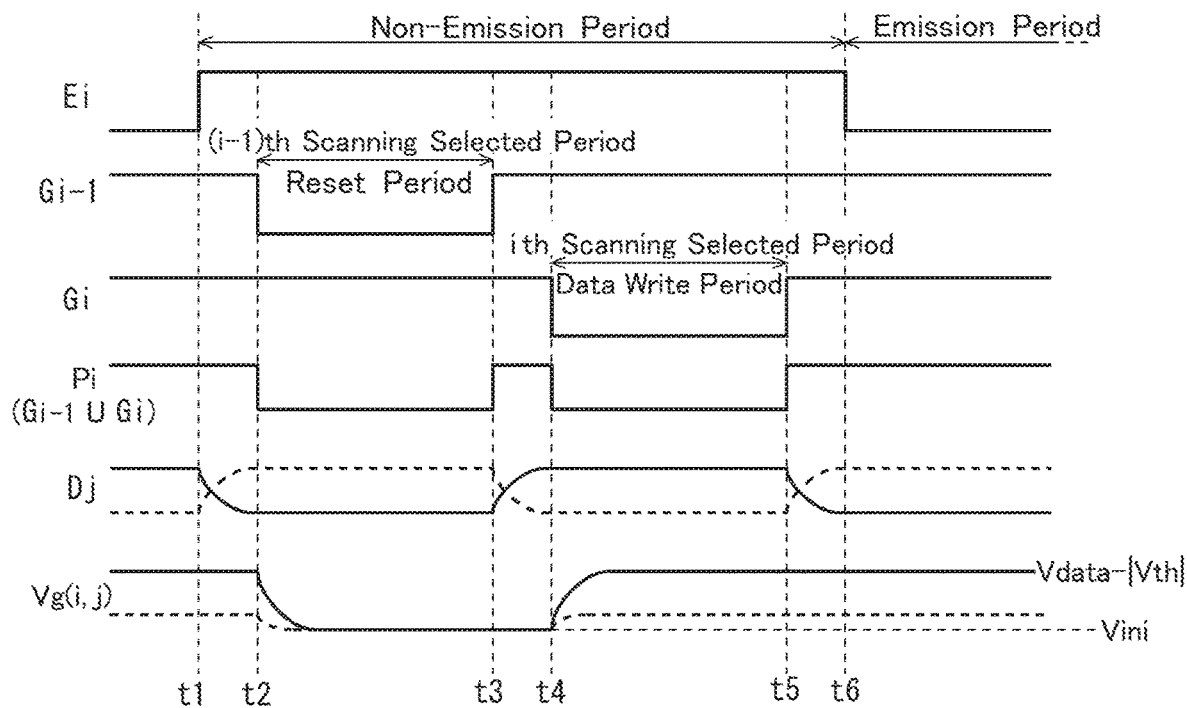
FIG. 5 is a signal waveform diagram for describing the driving of the display device according to the first embodiment.
Figure 6:
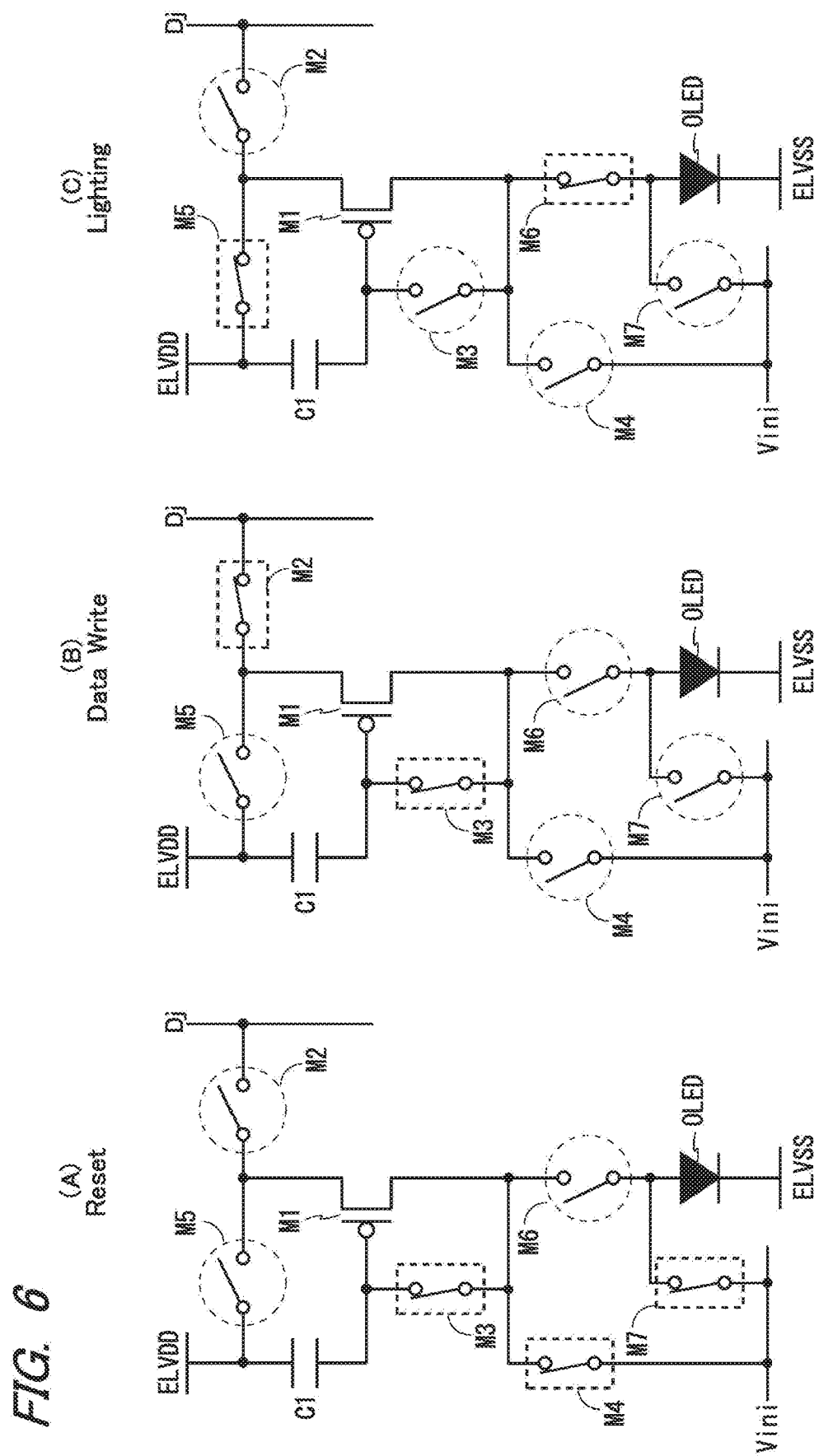
FIG. 6 consists of a circuit diagram (A) illustrating a reset operation of the pixel circuit in the first embodiment, a circuit diagram (B) illustrating a data write operation of the pixel circuit, and a circuit diagram (C) illustrating a lighting operation of the pixel circuit.

Next, the configuration and operation of the pixel circuit 15 in the present embodiment will be described with reference to FIGS. 4 to 6. FIG. 4 is a circuit diagram illustrating the configuration of the pixel circuit 15 in the present embodiment. FIG. 5 is a signal waveform diagram for describing the driving of the organic EL display device 10 according to the present embodiment. (A) of FIG. 6 is a circuit diagram illustrating a reset operation of the pixel circuit 15 in the present embodiment, (B) of FIG. 6 is a circuit diagram illustrating a data write operation of the pixel circuit 15, and (C) of FIG. 6 is a circuit diagram illustrating a lighting operation of the pixel circuit 15.

FIG. 4 illustrates the configuration of the pixel circuits 15 corresponding to the ith scanning signal line Gi and the jth data signal line Dj, that is, the pixel circuit Pix(i,j) on the ith row and the jth column in the present embodiment (1≤i≤n and 1≤j≤m). Similarly to the pixel circuit 15a (FIG. 2) in the conventional example, the pixel circuit 15 includes an organic EL element OLED as a display element, a drive transistor M1, a write control transistor M2, a threshold compensation transistor M3, a first initialization transistor M4, a first light emission control transistor M5, a second light emission control transistor M6, a second initialization transistor M7, and a holding capacitor C1. In the pixel circuit 15 as well, transistors M2 to M7 other than the drive transistor M1 function as switching elements.

As shown in FIG. 1, to the pixel circuit 15, there are connected a scanning signal line (corresponding scanning signal line) Gi corresponding to the pixel circuit 15, a scanning signal line (preceding scanning signal line) Gi−1 immediately before the corresponding scanning signal line Gi, a light emission control line (corresponding light emission control line) Ei corresponding to the pixel circuit 15, an OR signal line (hereinafter referred to as "corresponding OR signal line" in the description focusing on the pixel circuit) Pi corresponding to the pixel circuit 15, a data signal line (corresponding data signal line) Dj corresponding to the pixel circuit 15, an initialization voltage supply line Vini, a high-level power line ELVDD, and a low-level power line ELVSS.

As illustrated in FIG. 4, similarly to the pixel circuit 15a (FIG. 2) in the conventional example, in the pixel circuit 15, the source terminal as the first conduction terminal of the drive transistor M1 is connected to the corresponding data signal line Dj via the write control transistor M2 and is connected to the high-level power line ELVDD via the first light emission control transistor M5. The drain terminal of the drive transistor M1 as the second conduction terminal is connected to the anode electrode as the first terminal of the organic EL element OLED via the second light emission control transistor M6 and is connected to the initialization voltage supply line Vini via the first initialization transistor M4. The gate terminal of the drive transistor M1 is connected to the high-level power line ELVDD via the holding capacitor C1 and is connected to the drain terminal of the drive transistor M1 via the threshold compensation transistor M3. In the present embodiment, unlike the pixel circuit 15a in the conventional example, the gate terminal of the drive transistor M1 is not directly connected to the first initialization transistor M4 but is connected to the first initialization transistor M4 via the threshold compensation transistor M3, as illustrated in FIG. 4. Therefore, the gate terminal of the drive transistor M1 is connected to the initialization voltage supply line Vini via the threshold compensation transistor M3 and the first initialization transistor M4. The anode electrode, as the first terminal, of the organic EL element OLED is connected to the initialization voltage supply line Vini via a second initialization transistor M7, and a cathode electrode, as the second terminal, of the organic EL element OLED is connected to the low-level power line ELVSS. The gate terminal of the write control transistor M2 is connected to the corresponding scanning signal line Gi, the gate terminals of the first and second light emission control transistors M5, M6 are connected to the corresponding light emission control line Ei, and the gate terminals of the first and second initialization transistors M4, M7 are connected to the preceding scanning signal line Gi−1. The gate terminal of the threshold compensation transistor M3 is connected to the corresponding OR signal line Pi, which is different from the pixel circuit 15a in the conventional example. Note that the drive current I1 flowing through the organic EL element OLED in the pixel circuit 15 in the emission period is given by Equation (1) above, as in the pixel circuit 15a in the conventional example.

FIG. 5 illustrates changes in the voltage of each signal line (corresponding light emission control line Ei, preceding scanning signal line Gi−1, corresponding scanning signal line Gi, corresponding OR signal line Pi, and corresponding data signal line Dj) and the gate voltage Vg of the drive transistor M1 during the reset operation, the data write operation, and the lighting operation of the pixel circuit 15a illustrated in FIG. 4, that is, the pixel circuit Pix(i,j) on the ith row and the jth column. In FIG. 5, as in the conventional example (cf. FIG. 3), a period from time t1 to time t6 is a non-emission period for the pixel circuits Pix(i,1) to Pix(i,m) on the ith row. A period from time t2 to t4 is the (i−1)th horizontal period, and a period from time t2 to t3 is a selection period for the (i−1)th scanning signal line (preceding scanning signal line) Gi−1, that is, (i−1)th scanning selected period. The (i−1)th scanning selected period corresponds to a reset period for the pixel circuits Pix(i,1) to Pix(i,m) on the ith row. A period from time t4 to time t6 is the ith horizontal period, and a period from time t4 to time t5 is a selection period for the ith scanning signal line (corresponding scanning signal line) Gi, that is, ith scanning selected period. The ith scanning selected period corresponds to a data write period for the pixel circuits Pix(i,1) to Pix(i,m) on the ith row.

In the present embodiment, similarly to the above conventional example, in the pixel circuit Pix(i,j) on the ith row and the jth column, when the voltage of the light emission control line Ei changes from the low level to the high level at time t1 as illustrated in FIG. 5, the first and second light emission control transistors M5, M6 change from the on-state to the off-state, and the organic EL element OLED comes into a non-emission state. During the period from time t1 to the start time t2 of the (i−1)th scanning selected period, the data-side drive circuit 30 starts to apply a data signal D(j) as the data voltage of the pixel in the (i−1)th row and jth column to the data signal line Dj, but in the pixel circuit Pix(i,j), the write control transistor M2 connected to the data signal line Dj is in the off-state.

At time t2, the voltage of the preceding scanning signal line Gi−1 changes from the high level to the low level, so that the preceding scanning signal line Gi−1 comes into the selected state. Therefore, the first and second initialization transistors M4, M7 change to the on-state. In the present embodiment, as illustrated in FIG. 5, the voltage of the corresponding OR signal line Pi also becomes the low level at time t2. Thus, unlike the conventional example, not only the first and second initialization transistors M4, M7 but also the threshold compensation transistor M3 comes into the on-state.

The period from time t2 to time t3 is a reset period in the pixel circuits Pix(i,1) to Pix(i,m) on the ith row, and in this reset period, the first and second initialization transistors M4, M7 and the threshold compensation transistor M3 are in the on-state in the pixel circuit Pix(i,j), as described above. (A) of FIG. 6 schematically illustrates the state of the pixel circuit Pix(i,j) in this reset period, that is, the circuit state during the reset operation. In (A) of FIG. 6, a circle of dotted lines indicates that a transistor serving as a switching element therein is in the off-state, and a rectangle of dotted lines indicates that a transistor serving as a switching element therein is in the on-state (such a representation method is also employed in (B) and (C) of FIG. 6 and (A) to (C) of FIG. 10 to be described later). In this reset period, as illustrated in (A) of FIG. 6, since the first initialization transistor M4 and the threshold compensation transistor M3 are in the on-state, the initialization voltage supply line Vini is electrically connected to the gate terminal of the drive transistor M1 and one terminal of the holding capacitor C1 via the two transistors M4, M3. That is, the two transistors M3, M4 form a path (hereinafter referred to as "reset path") for supplying the initialization voltage Vini to the gate terminal of the drive transistor M1. Therefore, in the reset period, the initialization voltage Vini is supplied from the initialization voltage supply line Vini to the gate terminal of the drive transistor M1 through the reset path, whereby the gate voltage Vg and the hold voltage of the holding capacitor C1 are initialized as in the conventional example (cf. Equations (3) and (4) above). In the reset period, with the second initialization transistor M7 being in the on-state, the charge held in the parasitic capacitance of the organic EL element OLED is released, and the anode voltage Va is also initialized.

At time t3, as illustrated in FIG. 5, the voltage of the preceding scanning signal line Gi−1 changes to the high level, so that the preceding scanning signal line Gi−1 comes into the unselected state. Therefore, the first and second initialization transistors M4, M7 change to the off-state. At this time, since the voltage of the OR signal line Pi also changes to the high level, the threshold compensation transistor M3 also changes to the off-state. During the period from time t3 to the start time t4 of the ith scanning selected period, the data-side drive circuit 30 starts to apply the data signal D(j) as the data voltage of the pixel on the ith row and jth column to the data signal line Dj and continues to apply the data signal D(j) at least until the end time t5 of the ith scanning selected period.

At time t4, as illustrated in FIG. 5, the voltage of the corresponding scanning signal line Gi changes from the high level to the low level, so that the corresponding scanning signal line Gi comes into the selected state. Hence the write control transistor M2 changes to the on-state. At this time, since the voltage of the OR signal line Pi also changes to the low level, the threshold compensation transistor M3 also changes to the on-state.

The period from time t4 to time t5 is a data write period in the pixel circuits Pix(i,1) to Pix(i,m) on the ith row, and in the data write period, as described above, the write control transistor M2 and the threshold compensation transistor M3 are in the on-state. (B) of FIG. 6 schematically illustrates the state of the pixel circuit Pix(i,j) in the data write period, that is, the circuit state during the data write operation. In the data write period, as in the conventional example, the voltage of the corresponding data signal line Dj is supplied as the data voltage Vdata to the holding capacitor C1 via the drive transistor M1 in the diode-connected state. As a result, as illustrated in FIG. 5, the gate voltage Vg(i,j) changes toward a value given by Equation (5) above. That is, in the data write period, the data voltage subjected to threshold compensation is written to the holding capacitor C1, and the gate voltage Vg(i,j) becomes the value given by Equation (5) above.

At time t5, which is the end time of the ith scanning selected period as the data write period, the voltage of the corresponding scanning signal line Gi changes to the high level, whereby the write control transistor M2 changes to the off-state. At this time, as illustrated in FIG. 5, since the voltage of the OR signal line Pi also changes to the high level, the threshold compensation transistor M3 also changes to the off-state.

Thereafter, at time t6, the voltage of the light emission control line Ei changes to the low level. Therefore, the first and second light emission control transistors M5, M6 change to the on-state. A period after time t6 is an emission period, and during the emission period, in the pixel circuit Pix(i,j), the first and second light emission control transistors M5, M6 are in the on-state as described above, and the write control transistor M2, the threshold compensation transistor M3, the first initialization transistor M4, and the second initialization transistor M7 are in the off-state. (C) of FIG. 6 schematically illustrates the state of the pixel circuit Pix(i,j) in the emission period, that is, the circuit state during the lighting operation. In the emission period, a current I1 flows from the high-level power line ELVDD to the low-level power line ELVSS via the first light emission control transistor M5, the drive transistor M1, the second light emission control transistor M6, and the organic EL element OLED, as in the conventional example. The current I1 corresponds to the voltage written to the holding capacitor C1 in the data write period (t4 to t5) above, the voltage being simultaneously subjected to the threshold compensation in the data write period, and hence the current I1 is given by Equation (6) above. Thus, in the emission period, the organic EL element OLED emits light with a luminance corresponding to the data voltage Vdata, which is the voltage of the corresponding data signal line Dj in the ith scanning selected period, regardless of the threshold voltage Vth of the drive transistor M1, as in the conventional example.

<1.5 Actions and Effects>

Figure 7:
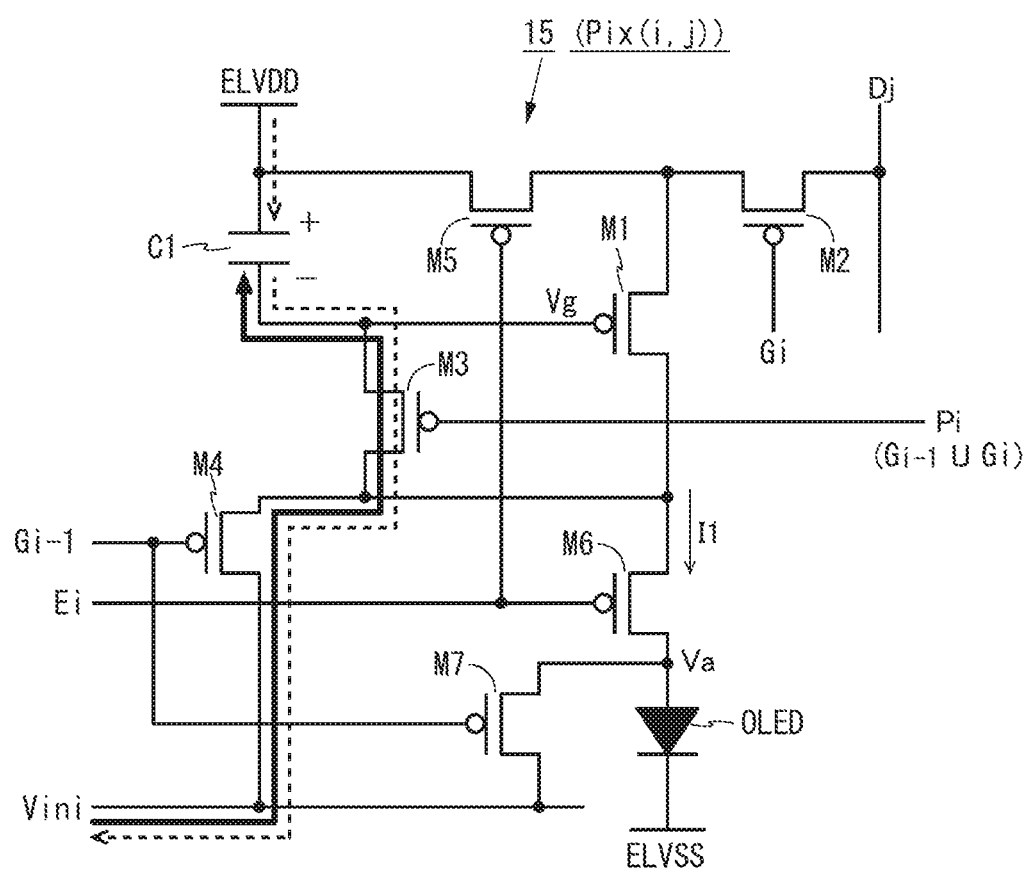
FIG. 7 is a circuit diagram for describing the action and effect of the first embodiment.

As described above, in the present embodiment, similarly to the above conventional example, in the pixel circuit Pix(i,j), the voltage of the corresponding data signal line Dj is supplied as the data voltage Vdata to the holding capacitor C1 via the drive transistor M1 in the diode-connected state, thereby compensating for variations and shifts in the threshold voltage of the drive transistor M1. The data write with threshold compensation as thus described requires initialization of the gate voltage Vg of the drive transistor M1 (initialization of the hold voltage of the holding capacitor C1) before the data write operation, as in the conventional example. In the present embodiment, unlike the conventional example (FIG. 2), the first initialization transistor M4 and the threshold compensation transistor M3 are in the on-state in the reset period, and as illustrated in FIG. 7, a reset path for supplying the initialization voltage Vini to the gate terminal of the drive transistor M1 is formed by these two transistors M4, M3 (cf. bold solid line in FIG. 7). In the present embodiment, since the drive transistor M1 is of the P-channel type, the formation of this reset path causes a current to flow as indicated by a dotted line in FIG. 7 to charge the holding capacitor C1, and as a result, the gate voltage Vg is initialized to be the initialization voltage Vini.

Thus, in the present embodiment, although the OR signal line Pi is required to drive the pixel circuit 15 (Pix(i,j)) (i=1 to n), the threshold compensation transistor is connected in series to the first initialization transistor M4 between the gate terminal of the drive transistor M1 and the initialization voltage supply line Vini (cf. FIG. 8), and the gate voltage Vg of the drive transistor M1 is initialized by the reset path including the two transistors M4, M3 connected in series. In the pixel circuit 15 having such a configuration, the transistor serving as a switching element connected to the gate terminal (one terminal of the holding capacitor C1) of the drive transistor M1 is the threshold compensation transistor M3 alone, and the gate terminal is connected to the anode electrode of the organic EL element OLED via the threshold compensation transistor M3 and the second light emission control transistor M6 (cf. FIG. 4). In the emission period, the anode voltage Va of the organic EL element OLED is at least several volts higher than the voltage of the initialization voltage supply line Vini, and the second light emission control transistor M6 is in the on-state. Therefore, the voltage applied between the source and drain of the threshold compensation transistor M3 in the off-state in the emission period is a voltage corresponding to the difference between the gate voltage Vg of the drive transistor M1 and the anode voltage Va (cf. (C) of FIG. 6), which is smaller than the voltage applied between the source and drain of the first initialization transistor M4 (cf. FIG. 2) in the off-state in the conventional example (Vg-Vini). Thereby, the leakage current of the transistor in the off-state, which causes a decrease in the gate voltage Vg in the emission period, is sufficiently reduced. It is thus possible to prevent the reduction in the gate voltage Vg due to leakage current of the off-state transistor in the emission period without increasing the size of the first initialization transistor M4 as compared to the conventional example. Therefore, according to the present embodiment, it is possible to achieve the pixel circuit 15 having the same function as that of the pixel circuit 15a in the conventional example (including the function of the threshold compensation) and not generating a defective bright point due to the leakage current as described above, without increasing the area of the pixel circuit 15.

2. Second Embodiment

In the pixel circuit Pix(i,j) of the first embodiment, as illustrated in FIG. 4, the gate terminal of the second initialization transistor M7 is connected to the preceding scanning signal line Gi−1. Therefore, as illustrated in FIG. 5, the anode voltage Va of the organic EL display element OLED is initialized by the second initialization transistor M7 coming into the on-state in the (i−1)th scanning selected period as the reset period. However, the second initialization transistor M7 may be in the on-state in the ith scanning selected period as the data write period, and hence the gate terminal of the second initialization transistor M7 may be connected to the OR signal line Pi instead of the preceding scanning signal line Gi−1. Hereinafter, an organic EL display device having such a configuration will be described as a second embodiment.

Figure 8:
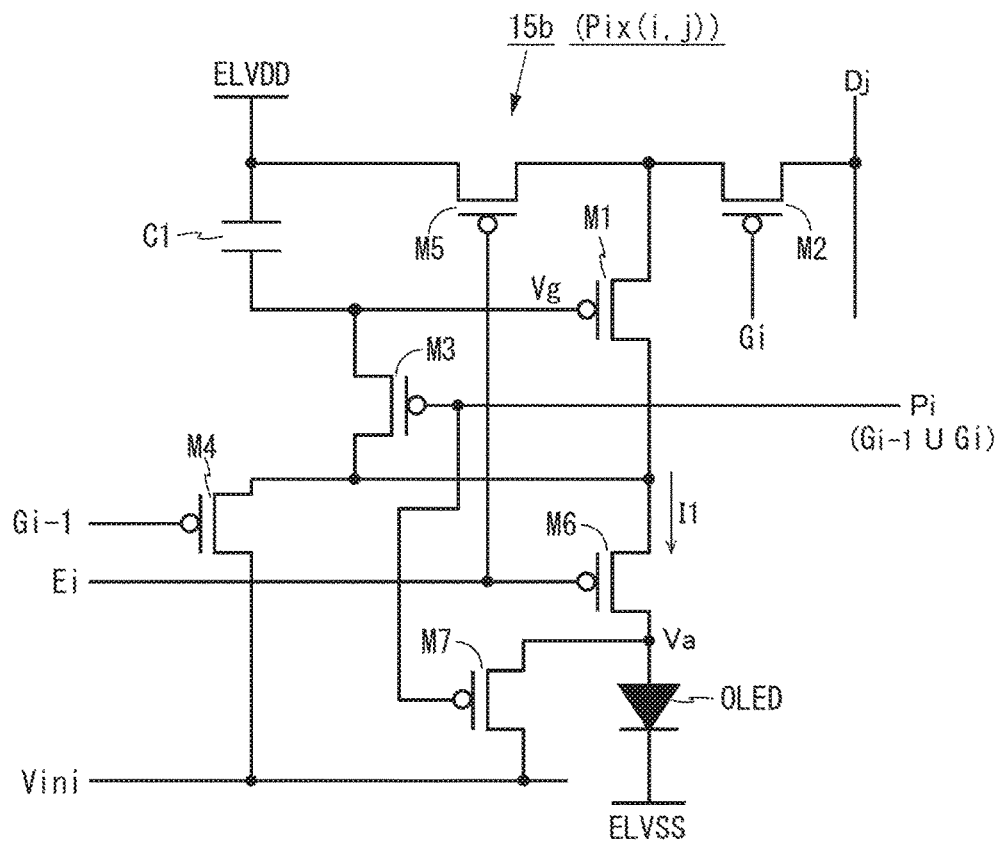
FIG. 8 is a circuit diagram illustrating a configuration of a pixel circuit in a display device according to a second embodiment.
Figure 9:
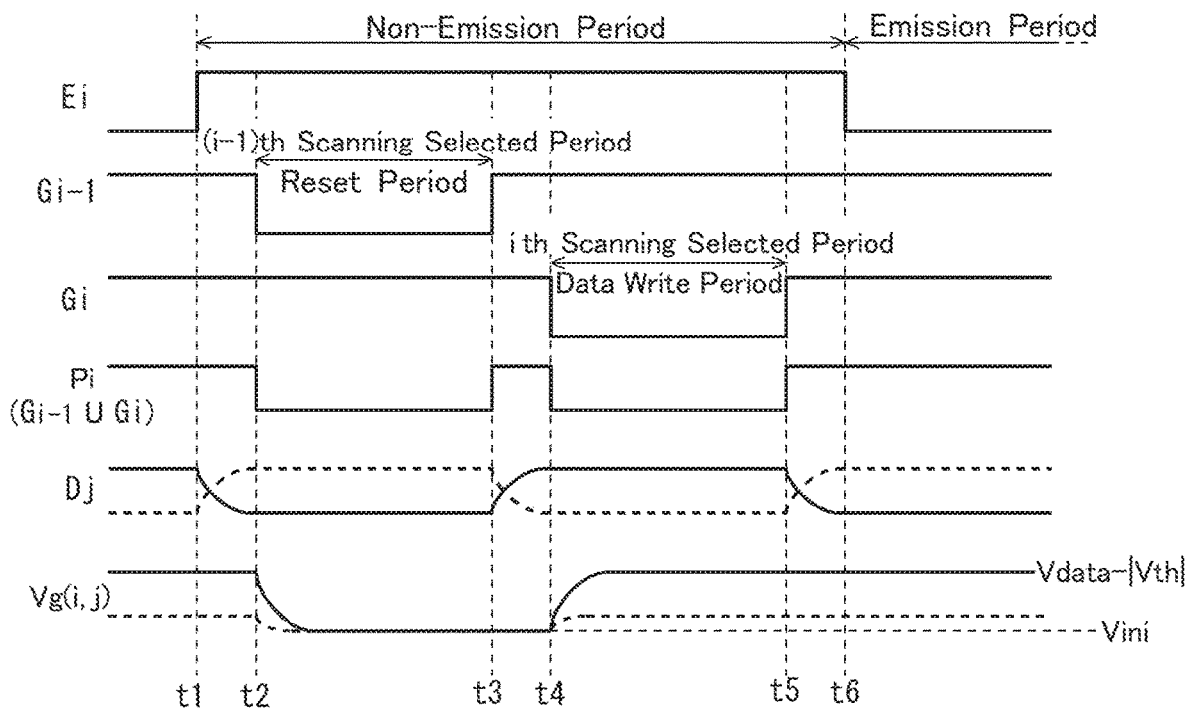
FIG. 9 is a signal waveform diagram for describing the driving of the display device according to the second embodiment.
Figure 10:
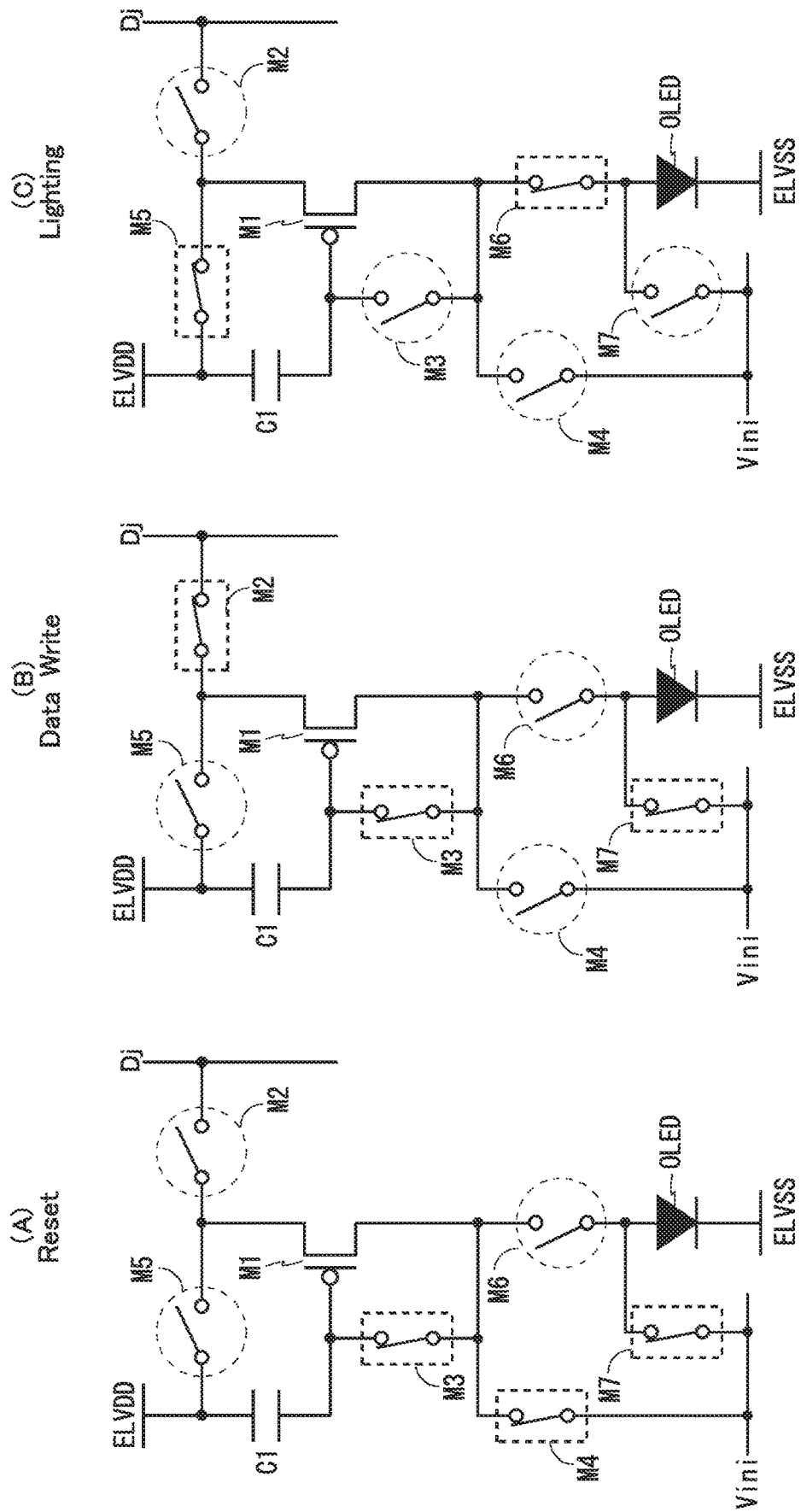
FIG. 10 consists of a circuit diagram (A) illustrating a reset operation of the pixel circuit in the second embodiment, a circuit diagram (B) illustrating a data write operation of the pixel circuit, and a circuit diagram (C) illustrating a lighting operation of the pixel circuit.

The display device according to the present embodiment is also an organic EL display device employing an internal compensation scheme, and the overall configuration thereof is the same as the overall configuration (FIG. 1) of the display device 10 according to the first embodiment. For this reason, in the configuration of the present embodiment, parts equivalent to or corresponding to those in the configuration of the first embodiment are denoted by equivalent reference numerals and will not be described in detail. Hereinafter, the configuration and operation of the present embodiment will be described with reference to FIGS. 8 to 10 together with FIG. 1, focusing on differences from the first embodiment. FIG. 8 is a circuit diagram illustrating a configuration of a pixel circuit 15b in the present embodiment. FIG. 9 is a signal waveform diagram for describing the driving of the organic EL display device according to the present embodiment. (A) of FIG. 10 is a circuit diagram illustrating a reset operation of the pixel circuit 15b in the present embodiment, (B) of FIG. 10 is a circuit diagram illustrating a data write operation of the pixel circuit 15b, and (C) of FIG. 10 is a circuit diagram illustrating a lighting operation of the pixel circuit 15b.

FIG. 8 illustrates the configuration of the pixel circuits 15b corresponding to the ith scanning signal line Gi and the jth data signal line Dj, that is, the pixel circuit Pix(i,j) on the ith row and the jth column in the present embodiment (1≤i≤n and 1≤j≤m). Similarly to the pixel circuit 15 (FIG. 4) in the first embodiment, the pixel circuit 15b includes an organic EL element OLED as a display element, a drive transistor M1, a write control transistor M2, a threshold compensation transistor M3, a first initialization transistor M4, a first light emission control transistor M5, a second light emission control transistor M6, a second initialization transistor M7, and a holding capacitor C1. As illustrated in FIG. 8, in the pixel circuit 15b, the gate terminal of the second initialization transistor M7 is connected to the OR signal line Pi, and in this respect, the pixel circuit 15b differs from the pixel circuit 15 in the first embodiment where the gate terminal of the second initialization transistor M7 is connected to the preceding scanning signal line Gi−1. The other parts of the connection configuration in the pixel circuit 15b are the same as those of the pixel circuit 15 in the first embodiment (cf. FIG. 4).

FIG. 9 illustrates changes in the voltage of each signal line (corresponding light emission control line Ei, preceding scanning signal line Gi−1, corresponding scanning signal line Gi, corresponding OR signal line Pi, and corresponding data signal line Dj) and the gate voltage Vg of the drive transistor M1 during the reset operation, the data write operation, and the lighting operation of the pixel circuit 15b illustrated in FIG. 8, that is, the pixel circuit Pix(i,j) on the ith row and the jth column. The voltage changes of these signal lines are the same as those of the corresponding signal lines in the first embodiment (FIG. 5).

A period from time t2 to time t3 illustrated in FIG. 9 is a reset period for the pixel circuit Pix(i,j). (A) of FIG. 10 schematically illustrates the state of the pixel circuit Pix(i,j) in this reset period, that is, the circuit state during the reset operation. As illustrated in (A) of FIG. 10, the reset operation in the present embodiment is the same as the reset operation ((A) of FIG. 6) in the first embodiment. Therefore, in the reset period, the first initialization transistor M4 and the threshold compensation transistor M3 connected in series with each other come into the on-state to form a reset path, and the initialization voltage Vini is supplied from the initialization voltage supply line Vini to the gate terminal of the drive transistor M1 through the reset path. In the reset period, as in the first embodiment, the second initialization transistor M7 is in the on-state, so that the accumulated charge in the parasitic capacitance of the organic EL element OLED is released, and the anode voltage Va is also initialized.

A period from time t4 to time t5 illustrated in FIG. 9 is a data write period for the pixel circuit Pix(i,j). (B) of FIG. 10 schematically illustrates the state of the pixel circuit Pix(i,j) in the data write period, that is, the circuit state during the data write operation. As illustrated in (B) of FIG. 10, the data write operation in the present embodiment differs from the data write operation ((B) of FIG. 6) in the first embodiment where the second initialization transistor M7 is in the off-state in that the second initialization transistor M7 is in the on-state. However, in the other respects, the operation is the same as the data write operation in the first embodiment, and in the present embodiment as well, the voltage of the corresponding data signal line Dj is supplied as the data voltage Vdata to the holding capacitor C1 via the drive transistor M1 in the diode-connected state.

A period after time t6 illustrated in FIG. 9 is an emission period for the pixel circuit Pix(i,j). (C) of FIG. 10 schematically illustrates the state of the pixel circuit Pix(i,j) in the emission period, that is, the circuit state during the lighting operation. As illustrated in (C) of FIG. 10, the lighting operation in the present embodiment is the same as the lighting operation ((C) of FIG. 6) in the first embodiment. Therefore, in the emission period, as in the first embodiment, a current I1 flows from the high-level power line ELVDD to the low-level power line ELVSS via the first light emission control transistor M5, the drive transistor M1, the second light emission control transistor M6, and the organic EL element OLED. The current I1 corresponds to the voltage written to the holding capacitor C1 in the data write period (t4 to t5) above, the voltage being simultaneously subjected to the threshold compensation in the data write period, and hence the current I1 is given by Equation (6) above. Thus, in the emission period, as in the first embodiment, the organic EL element OLED emits light with a luminance corresponding to the data voltage Vdata, which is the voltage of the corresponding data signal line Dj in the ith selected scanning period, regardless of the threshold voltage Vth of the drive transistor M1.

As described above, in the present embodiment as well, the pixel circuit Pix(i,j) operates substantially in the same manner as in the first embodiment, although the initialization operation of the anode voltage Va of the organic EL element OLED is slightly different (cf. (B) of FIG. 10). That is, in the reset period, as in the first embodiment, the gate voltage Vg is initialized by supplying the initialization voltage Vini to the gate terminal of the drive transistor M1 through the reset path in which the two transistors M4, M3 are connected in series (cf. FIG. 7), which is different from the conventional example where the initialization voltage Vini is supplied to the gate terminal of the drive transistor M1 through the reset path including only one transistor M4. Therefore, in the present embodiment as well, the reduction in the gate voltage Vg due to the leakage current of the off-state transistor in the emission period can be prevented, so that it is possible to achieve the pixel circuit 15b having the same function as that of the pixel circuit 15a in the conventional example (including the function of the threshold compensation function) and not generating a defective bright point due to leakage current, without increasing the area of the pixel circuit 15b as compared to the conventional example.

3. Modified Example

The present invention is not limited to each of the above embodiments, and various modifications can be made without departing from the scope of the present invention.

Further, in the above, each embodiment and the modification thereof have been described by taking the organic EL display device as an example, but the present invention is not limited to the organic EL display device and may be applied to any display device of an internal compensation scheme using a display element that is driven by a current. The display element that can be used here is a display element with its luminance, transmittance, or the like, controlled by a current, and for example, an inorganic light-emitting diode, a quantum dot light-emitting diode (QLED), and the like can be used in addition to the organic EL element, that is, the organic light-emitting diode (OLED).

DESCRIPTION OF REFERENCE CHARACTERS

10: Organic EL Display Device
11: Display Unit
15,15b: Pixel Circuit
Pix(i,j): Pixel Circuit (i=1 to n, j=1 to m)
20: Display Control Circuit
30: Data-Side Drive Circuit
  (Data Signal Line Drive Circuit)
40: Scanning-Side Drive Circuit
  (Scanning Signal Line/Light Emission Control/OR Drive Circuit)
Gi: Scanning Signal Line (i=1 to n)
Ei: Light Emission Control Line (i=1 to n)
Pi: OR Signal Line (i=1 to n)
Dj: Data Signal Line (j=1 to m)
Vini: Initialization Voltage Supply Line, Initialization Voltage
ELVDD: High-Level Power Line (First Power Line), High-Level Power Supply Voltage
ELVSS: Low-Level Power Line (Second Power Line), Low-Level Power Supply Voltage
OLED: Organic EL Element
C1: Holding Capacitor
M1: Drive Transistor
M2: Write Control Transistor
  (Write Control Switching Element)
M3: Threshold Compensation Transistor
  (Threshold Compensation Switching Element)
M4: First Initialization Transistor
  (First Initialization Switching Element)
M5: First Light Emission Control Transistor
  (First LIGHT Emission Control Switching Element)
M6: Second Light Emission Control Transistor
  (Second Light Emission Control Switching Element)
M7: Second Initialization Transistor
  (Second Initialization Switching Element)

The invention claimed is:

1. A display device having a plurality of data signal lines, a plurality of scanning signal lines intersecting with the plurality of data signal lines, a plurality of light emission control lines corresponding respectively to the plurality of scanning signal lines, and a plurality of pixel circuits arranged in a matrix along the plurality of data signal lines and the plurality of scanning signal lines, the device comprising:
  first and second power lines;
  an initialization voltage supply line;
  a data signal line drive circuit configured to drive the plurality of data signal lines;
  a scanning signal line drive circuit configured to selectively drive the plurality of scanning signal lines;
  a light emission control circuit configured to drive the plurality of light emission control lines;
  a plurality of OR signal lines corresponding to the plurality of scanning signal lines, respectively; and
  an OR drive circuit configured to apply, to each of the plurality of OR signal lines, a signal of logical sum of a signal of a scanning signal line corresponding to the each of the OR signal lines and a signal of a scanning signal line that is selected immediately before the corresponding scanning signal line is selected, wherein
  each of the pixel circuits includes
    a display element that is driven by a current,
    a holding capacitor configured to hold a voltage for controlling a drive current of the display element,
    a drive transistor configured to control the drive current of the display element in accordance with a voltage held by the holding capacitor,
    a write control switching element,
    a threshold compensation switching element,
    first and second light emission control switching elements, and
    first and second initialization switching elements,
  the drive transistor has a first conduction terminal connected to any one of the plurality of data signal lines via the write control switching element as well as connected to the first power line via the first light emission control switching element,
  the drive transistor has a second conduction terminal connected to a first terminal of the display element via the second light emission control switching element as well as connected to the initialization voltage supply line via the first initialization switching element,
  the drive transistor has a control terminal connected to the first power line via the holding capacitor as well as connected to the second conduction terminal via the threshold compensation switching element,
  the display element has the first terminal connected to the initialization voltage supply line via the second initialization switching element, and a second terminal connected to the second power line,
    the write control switching element has a control terminal connected to any one of the plurality of scanning signal lines,
  the first and second light emission control switching elements have respective control terminals connected to any one of the plurality of light emission control lines,
    the threshold compensation switching element has a control terminal connected to an OR signal line corresponding to the any one of the scanning signal lines,
  the first and second initialization switching elements have respective control terminals connected to a scanning signal line that is selected immediately before the any one of the scanning signal lines is selected, and
  at a time of initializing a hold voltage of the holding capacitor, the threshold compensation switching element and the first initialization switching element are controlled to be in an on-state.

2. The display device according to claim 1, wherein at a time of writing a voltage of the any one of the data signal lines to the holding capacitor as a data voltage, the write control switching element and the threshold compensation switching element are controlled to be in the on-state, and the first light emission control switching element, the second light emission control switching element, and the first initialization switching element are controlled to be in an off-state.

3. The display device according to claim 2, wherein at a time of driving the display element based on the hold voltage of the holding capacitor, the first light emission control switching element and the second light emission control switching element are controlled to be in the on-state, and the write control switching element, the threshold compensation switching element, the first initialization switching element, and the second initialization switching element are controlled to be in the off-state.

4. The display device according to claim 1, wherein
the scanning signal line drive circuit applies a plurality of scanning signals that become active sequentially for a predetermined period to the plurality of scanning signal lines such that the plurality of scanning signal lines are sequentially selected for the predetermined period, and
the light emission control circuit applies, for each of the plurality of scanning signal lines, a light emission control signal to a light emission control line corresponding to the each of scanning signal lines, the light emission control signal being inactive during a non-emission period including a selection period for the each of scanning signal lines and a selection period for a preceding scanning signal line that is a scanning signal line selected immediately before the each of scanning signal lines is selected, the light emission control signal being active during an emission period including selection periods for scanning signal lines except for the each of scanning signal lines and the preceding scanning signal line.

5. The display device according to claim 1, wherein
the first power line is a high-voltage-side power line, and the second power line is a low-voltage-side power line, and
the drive transistor is a P-channel type transistor.

6. A display device having a plurality of data signal lines, a plurality of scanning signal lines intersecting with the plurality of data signal lines, a plurality of light emission control lines corresponding respectively to the plurality of scanning signal lines, and a plurality of pixel circuits arranged in a matrix along the plurality of data signal lines and the plurality of scanning signal lines, the device comprising:
first and second power lines;
an initialization voltage supply line;
a data signal line drive circuit configured to drive the plurality of data signal lines;
a scanning signal line drive circuit configured to selectively drive the plurality of scanning signal lines;
a light emission control circuit configured to drive the plurality of light emission control lines;
a plurality of OR signal lines corresponding to the plurality of scanning signal lines, respectively; and
an OR drive circuit configured to apply, to each of the plurality of OR signal lines, a signal of logical sum of a signal of a scanning signal line corresponding to the each of the OR signal lines and a signal of a scanning signal line that is selected immediately before the corresponding scanning signal line is selected,
wherein
each of the pixel circuits includes
a display element that is driven by a current,
a holding capacitor configured to hold a voltage for controlling a drive current of the display element,
a drive transistor configured to control the drive current of the display element in accordance with a voltage held by the holding capacitor,
a write control switching element,
a threshold compensation switching element,
first and second light emission control switching elements, and
first and second initialization switching elements,
the drive transistor has a first conduction terminal connected to any one of the plurality of data signal lines via the write control switching element as well as connected to the first power line via the first light emission control switching element,
the drive transistor has a second conduction terminal connected to a first terminal of the display element via the second light emission control switching element as well as connected to the initialization voltage supply line via the first initialization switching element,
the drive transistor has a control terminal connected to the first power line via the holding capacitor as well as connected to the second conduction terminal via the threshold compensation switching element,
the display element has the first terminal connected to the initialization voltage supply line via the second initialization switching element, and a second terminal connected to the second power line,
the write control switching element has a control terminal connected to any one of the plurality of scanning signal lines,
the first and second light emission control switching elements have respective control terminals connected to any one of the plurality of light emission control lines,
the threshold compensation switching element and the second initialization switching element have respective control terminals connected to an OR signal line corresponding to the any one of the scanning signal lines,
the first initialization switching element has a control terminal connected to a scanning signal line that is selected immediately before the any one of the scanning signal lines is selected, and
at a time of initializing a hold voltage of the holding capacitor, the threshold compensation switching element and the first initialization switching element are controlled to be in an on-state.

7. The display device according to claim 6, wherein at a time of writing a voltage of the any one of the data signal lines to the holding capacitor as a data voltage, the write control switching element and the threshold compensation switching element are controlled to be in the on-state, and the first light emission control switching element, the second light emission control switching element, and the first initialization switching element are controlled to be in an off-state.

8. The display device according to claim 7, wherein at a time of driving the display element based on the hold voltage of the holding capacitor, the first light emission control switching element and the second light emission control switching element are controlled to be in the on-state, and the write control switching element, the threshold compensation switching element, the first initialization switching element, and the second initialization switching element are controlled to be in the off-state.

9. The display device according to claim 6, wherein
the scanning signal line drive circuit applies a plurality of scanning signals that become active sequentially for a predetermined period to the plurality of scanning signal lines such that the plurality of scanning signal lines are sequentially selected for the predetermined period, and
the light emission control circuit applies, for each of the plurality of scanning signal lines, a light emission control signal to a light emission control line corresponding to the each of scanning signal lines, the light emission control signal being inactive during a non-emission period including a selection period for the each of scanning signal lines and a selection period for a preceding scanning signal line that is a scanning signal line selected immediately before the each of scanning signal lines is selected, the light emission control signal being active during an emission period including selection periods for scanning signal lines except for the each of scanning signal lines and the preceding scanning signal line.

10. The display device according to claim 6, wherein
the first power line is a high-voltage-side power line, and
the second power line is a low-voltage-side power line, and
the drive transistor is a P-channel type transistor.

\* \* \* \* \*